June 2, 1942.　　　　G. R. PURIFOY　　　　2,284,843
CONTROL SYSTEM
Filed April 11, 1941
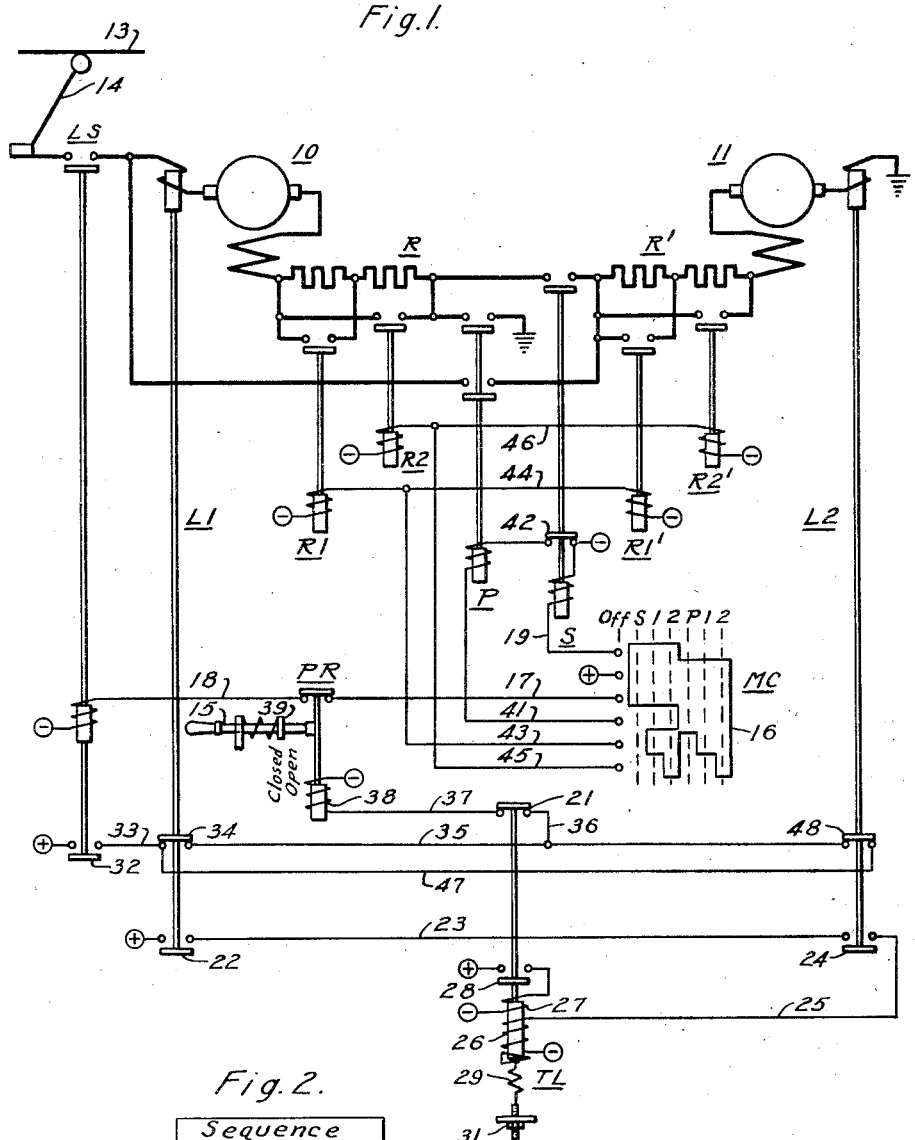
INVENTOR
George R. Purifoy.

Patented June 2, 1942

2,284,843

UNITED STATES PATENT OFFICE 2,284,843

CONTROL SYSTEM

George R. Purifoy, Pittsburgh, Pa., assignor to Westinghouse Electric & Manufacturing Company, East Pittsburgh, Pa., a corporation of Pennsylvania Application April 11, 1941, Serial No. 388,100

10 Claims. (Cl. 172—179)

My invention relates, generally, to control systems and, more particularly, to systems for controlling the operation of series motors.

It is well known that there is danger of a series motor overspeeding in the event that it should lose its load. Under normal operating conditions, this is unlikely to happen to the traction motors of an electrically propelled vehicle as the motors are usually geared directly to the wheel axles. However, if a motor pinion should become sufficiently loose to slip on the armature shaft dangerous overspeeding of the motor may result.

An object of my invention, generally stated, is to provide a control system which shall be simple and efficient in operation and which may be economically manufactured and installed.

A more specific object of my invention is to prevent overspeeding of electric motors.

Another object of my invention is to provide overspeed protection for a plurality of motors which may be operated in either series or parallel-circuit relation.

A further object of my invention is to prevent prolonged slipping of the wheels of an electrically propelled vehicle.

Other objects of my invention will be explained fully hereinafter or will be apparent to those skilled in the art.

According to one embodiment of my invention, overspeed protection for series motors, which may be operated in either series or parallel-circuit relation, is obtained by utilizing relays responsive to the armature current, a time delay relay and a lockout relay which cooperate to cause the motors to be disconnected from the power source in the event of overspeeding of a motor armature or prolonged slipping of the wheels.

For a fuller understanding of the nature and objects of my invention, reference may be had to the following detailed description, taken in conjunction with the accompanying drawing, in which:

Figure 1 is a diagrammatic view of a control system embodying my invention, and

Fig. 2 is a chart showing the sequence of operation of a portion of the apparatus illustrated in Fig. 1.

Referring to the drawing, the system shown therein comprises a pair of motors 10 and 11 which are of the series type usually utilized for propelling street cars and other vehicles, a line switch LS for connecting the motors 10 and 11 to a power conductor 13 through a current collector 14, a switch S for connecting the motors in series-circuit relation, a switch P for connecting the motors in parallel-circuit relation, resistors R and R' for controlling the motor current in the usual manner during acceleration of the vehicle, and switches R1, R1', R2, and R2' for shunting the resistors R and R' from the motor circuit. A manually operable controller MC is provided for controlling the operation of the switches S and P and the resistor shunting switches R1, R1', R2 and R2'.

It is well known that a series motor may overspeed in the event that it becomes disconnected from its load. Thus, in an electrically propelled vehicle in which the motor is geared to the wheel axles, the motor will overspeed if the motor pinion becomes loosened from the armature shaft, thereby permitting the armature to rotate freely.

In order to prevent dangerous overspeeding of either one of the motors 10 and 11, whether they are operating in series or in parallel-circuit relation, current responsive relays L1 and L2 are provided in the armature circuit for the motors 10 and 11, respectively. A time delay relay TL and a lockout relay PR cooperate with the relays L1 and L2 to open the line switch LS to disconnect the motors from the power conductor in case either one or both of the motors should overspeed.

If one of the motors starts overspeeding, the motor current is reduced, thereby operating the current-responsive relay connected in that motor circuit. The operation of the current-responsive relay causes the time delay relay TL to operate after a predetermined time interval which, in turn, operates the relay PR to deenergize the line switch LS, thereby disconnecting the motors from the power conductor. Since the relay PR is of a lockout type, it is latched in its open position and must be manually reset by means of a resetting device 15 before power can be reapplied to the motors.

The timing relay TL functions to prevent the motors from being disconnected from the power source as the result of a decrease in the motor current caused by temporary slipping of the wheels connected to either one of the motors. However, prolonged slipping of the wheels will result in the motors being disconnected from the power source. Thus, the present system not only functions to prevent dangerous overspeeding of the motors but also prevents the continued application of power to the motors during wheel slippage.

In order that the functioning of the foregoing apparatus may be more clearly understood, the operation of the system will now be described in more detail. Assuming that the apparatus is in the position shown in the drawing, power may be applied to the motors 10 and 11 by actuating the controller MC to position S, thereby closing the switches LS and S to connect the motors to the power conductor 13 in series-circuit relation. The energizing circuit for the switch LS may be traced from positive through a segment 16 of the controller MC, conductor 17, the contact members of the relay PR, conductor 18 and the actuating coil of the switch LS to negative. The energizing circuit for the switch S extends from the controller MC through conductor 19 and the coil of the switch S to negative.

When the switches LS and S are closed to connect the motors to the power conductor through the resistors R and R', the relays L1 and L2 are both operated by the current flowing in the motor circuit. The operation of both relays L1 and L2 energizes one of the coils on the relay TL, thereby operating this relay to open its contact members 21. The energizing circuit for the relay TL may be traced from positive through contact members 22 on the relay L1, conductor 23, contact members 24 on the relay L2, conductor 25, and the actuating coil 26 of the relay TL to the negative.

When the relay TL is operated, a circuit is established for a holding coil 27 on this relay which may be traced from positive through contact members 28 and the coil 27 to negative. The relay TL is provided with a spring 29 which opposes the action of the coils 26 and 27. The tension of the spring 29 may be adjusted by means of an adjusting nut 31.

It will be understood that the relay may be so adjusted that the coil 26 will produce sufficient force to operate the relay against the tension of the spring 29. When the coil 26 is deenergized, the coil 27 produces sufficient force to retain the relay in its uppermost position for a predetermined time interval while the flux produced by the coil 26 is decaying. However, the coil 27 will not hold the relay closed after the flux produced by the coil 26 is reduced below a predetermined amount. Thus, the time delay provided by the relay TL may be changed by either adjusting the spring 29, as shown, or by providing a resistor in the circuit for the coil 27 to vary the current flowing through this coil.

If one of the motors starts overspeeding while they are connected in series-circuit relation, the current in both motors is reduced, thereby causing both relays L1 and L2 to drop to their lowermost position. The operation of the relays L1 and L2 opens the energizing circuit for the coil 26 on the relay TL. After a predetermined time interval, the relay TL drops to its lowermost position as hereinbefore described, thereby establishing an energizing circuit for the actuating coil of the relay PR. This circuit may be traced from positive through an interlock 32 on the switch LS, conductor 33, contact members 34 on the relay L1, conductors 35, and 36, contact members 21 on the relay TL, conductor 37, and the actuating coil 38 of the relay PR to negative.

The operation of the relay PR deenergizes the line switch LS, thereby causing this switch to open to disconnect the motors from the power source. Furthermore, the latching device 15 locks the relay PR in its open position and power cannot be reapplied to the motors until the latching device is released to reset the relay PR. An indicating device 39 is provided on the relay PR to notify the operator that the car is out of service.

The motors may be connected in parallel-circuit relation in the usual manner by actuating the controller MC to position P, thereby opening the switch S and closing the switch P. The energizing circuit for the actuating coil of the switch P may be traced from the controller MC through conductor 41, the coil of the switch P and an interlock 42 on the switch S to negative.

The resistors R and R' may be shunted from the motor circuit by actuating the controller MC to positions 1 and 2 in the usual manner. When the controller is on position 1, the switches R1 and R1' are energized through a circuit which extends from the controller MC through conductors 43 and 44 and the coils of the switches R1 and R1' to the negative. When the controller is on position 2, the switches R2 and R2' are energized through a circuit which extends from the controller MC, through conductors 45 and 46 and the coils of the switches R2 and R2' to the negative.

In the event that either motor overspeeds while they are operating in parallel-circuit relation, both motors are disconnected from the power source. Thus, if the motor 11 overspeeds, thereby causing a reduction in the current flowing through this motor, the relay L2 drops to its lowermost position. The operation of the relay L2 deenergizes the coil 26 of the relay TL by opening the circuit through the contact members 24 of the relay L2.

As hereinbefore described, the relay TL drops to its lowermost position after a predetermined time interval, thereby establishing a circuit for the actuating coil of the relays PR through the interlock 32 on the switch LS, conductors 33 and 47, contact members 48 on the relay L2, conductors 35 and 36, contact members 21 on the relay TL, conductor 37 and the actuating coil 38 of the relay PR to negative. In this manner, the switch LS is opened to disconnect the motors from the power source.

Likewise, in the event that the motor 10 overspeeds while the motors are operating in parallel, the relay L1 operates to cause the motors to be disconnected from the power source in the manner hereinbefore described. Therefore, the present system provides overspeed protection for both series and parallel operation of the motors.

As hereinbefore explained, the relay TL prevents the motors from being disconnected by the operation of either one of the relays L1 and L2 as the result of a temporary decrease in the motor current such as may be caused by slipping the wheels of either motor for a short duration of time. Thus, if the wheels stop slipping and the motor current returns to its normal value before the relay TL operates, normal operation of the vehicle is resumed. However, if the wheel slippage continues beyond the time setting of the relay TL, the motors are disconnected from the power source and power must be reapplied to the motors by resetting the relay PR and operating the controller MC in the usual manner. Thus, continuous slipping of the wheels is prevented.

From the foregoing description, it is apparent that I have provided overspeed protection for motors of the series type for both series and parallel operation of the motors. Furthermore, the protective system that I have devised may be incorporated in motor control systems of the type usually utilized for controlling the operation of electric vehicles without interfering with the normal operation of the vehicle.

I do not desire to be restricted to the particular form or arrangement of parts herein shown and described, since it is evident that they may be changed and modified without departing from the spirit and scope of my invention as defined in the appended claims.

I claim as my invention:

1. In a motor control system, in combination, a motor, a power conductor, switching means for connecting the motor to the power conductor, relay means responsive to a decrease in the motor current for controlling the operation of said switching means to disconnect the motor from the power conductor after a predetermined time interval, and resettable means for preventing reclosing of said switching means.

2. In a motor control system, in combination, a motor, a power conductor, switching means for connecting the motor to the power conductor, relay means responsive to a decrease in the motor current for controlling the operation of said switching means to disconnect the motor from the power conductor after a predetermined time interval, and a manually resettable relay operable in response to the operation of said relay means for preventing reclosing of said switching means.

3. In a motor control system, in combination, a motor, a power conductor, switching means for connecting the motor to the power conductor, a relay responsive to a decrease in the motor current for controlling the operation of said switching means, means cooperating with said relay to delay the opening of said switching means for a predetermined time interval after the reduction in the motor current and resettable lockout means for preventing reclosing of the switching means.

4. In a motor control system, in combination, a motor, a power conductor, switching means for connecting the motor to the power conductor, a current responsive relay, and a time delay relay cooperating with said current responsive relay to open said switching means in a predetermined time interval after a predetermined reduction of the motor current.

5. In a motor control system, in combination, a motor, a power conductor, switching means for connecting the motor to the power conductor, a current responsive relay, a time delay relay cooperating with said current responsive relay to open said switching means in a predetermined time interval after a predetermined reduction of the motor current, and a relay for preventing reclosing of said switching means.

6. In a motor control system, in combination, a motor, a power conductor, switching means for connecting the motor to the power conductor, a current responsive relay, a time delay relay cooperating with said current responsive relay to open said switching means in a predetermined time interval after a predetermined reduction of the motor current, and a lockout relay for preventing reclosing of said switching means.

7. In a motor control system, in combination, a motor, a power conductor, switching means for connecting the motor to the power conductor, a current responsive relay, a time delay relay cooperating with said current responsive relay to open said switching means in a predetermined time interval after a predetermined reduction of the motor current, a lockout relay for preventing reclosing of said switching means, and means for resetting said lockout relay.

8. In a motor control system, in combination, a motor, a power conductor, switching means for connecting the motor to the power conductor, a current responsive relay, a time delay relay and a lockout relay operable in sequential relation to open said switching means in a predetermined time interval after a predetermined reduction in the motor current.

9. In a motor control system, in combination, a pair of motors, a power conductor, switching means for connecting the motors to the power conductor, means for connecting the motors in either series or parallel-circuit relation, current responsive relays, and a time delay relay cooperating with said current responsive relays to open said switching means in a predetermined time interval after a predetermined reduction of the current in either motor.

10. In a motor control system, in combination, a pair of motors, a power conductor, switching means for connecting the motors to the power conductor, means for connecting the motors in either series or parallel-circuit relation, current responsive relays, and a time delay relay cooperating with said current responsive relays to open said switching means in a predetermined time interval after a predetermined reduction of the current in either motor, and a relay for preventing reclosing of said switching means.

GEORGE R. PURIFOY.